No. 631,996. Patented Aug. 29, 1899.
J. H. PITKIN.
LENS FOR VEHICLE HEADLIGHTS.
(Application filed June 21, 1899.)
(No Model.)
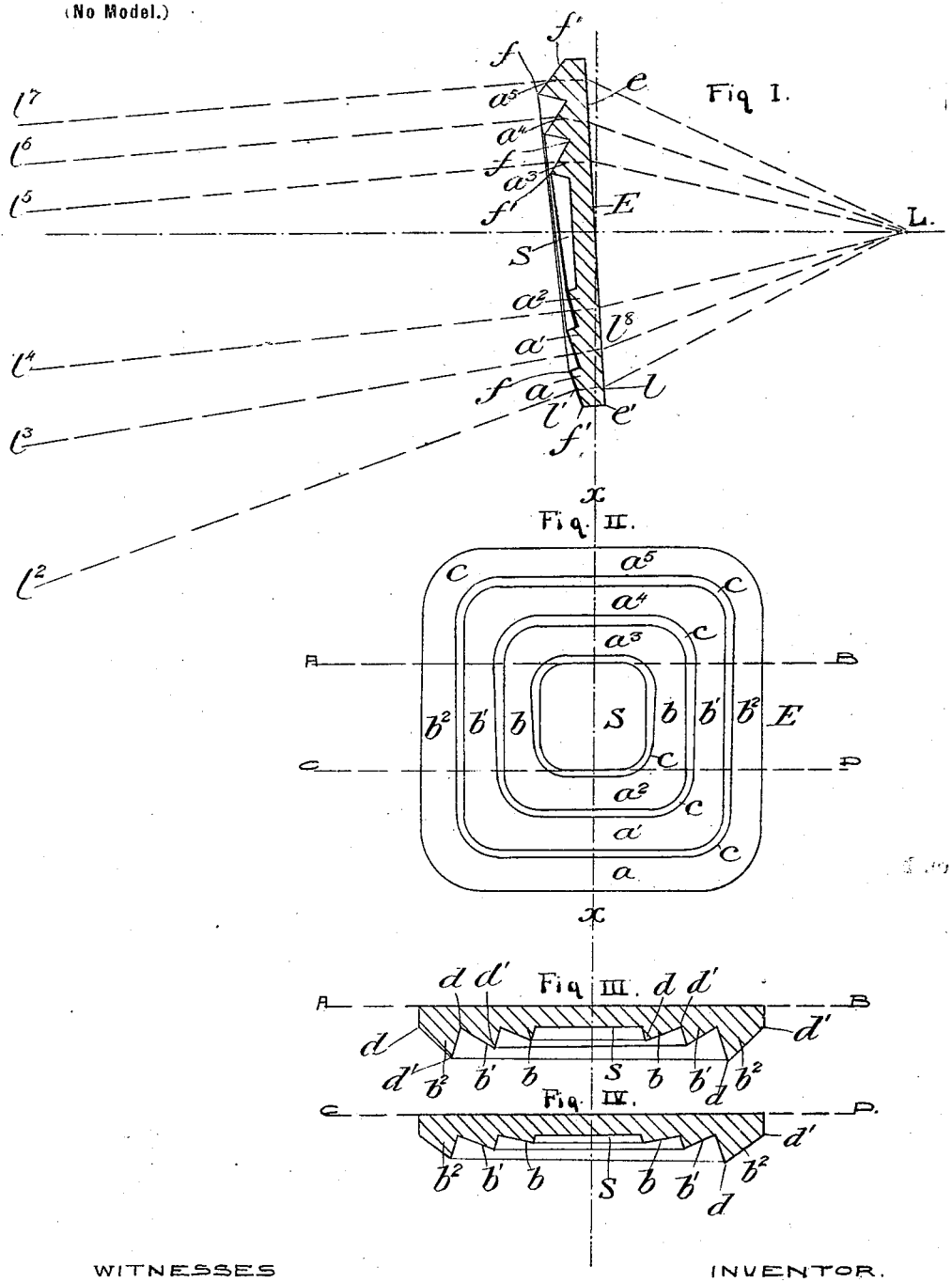

UNITED STATES PATENT OFFICE.

JULIAN H. PITKIN, OF CHICAGO, ILLINOIS.

LENS FOR VEHICLE-HEADLIGHTS.

SPECIFICATION forming part of Letters Patent No. 631,996, dated August 29, 1899.

Application filed June 21, 1899. Serial No. 721,313. (No model.)

*To all whom it may concern:*

Be it known that I, JULIAN H. PITKIN, a citizen of the United States, residing at Chicago, in the county of Cook and State of Illinois, have invented certain new and useful Improvements in Lenses for Vehicle-Headlights; and I do hereby declare the following to be a full, clear, and exact description of the invention, such as will enable others skilled in the art to which it appertains to make and use the same.

My invention relates to lenses for vehicle-headlights, and has for its object to provide such a device that will assemble the rays of light and throw them in a beam that shall be limited laterally to a narrow path and shall extend along the ground from a point in close proximity to the source of light to a point considerably distant therefrom without at the same time crossing the line of the rider's vision.

My improved lens is primarily intended for use on bicycles where a thoroughly illuminated path from the wheel to a distant point ahead is essential in order that the character of the road may be revealed to enable the rider to avoid obstruction and consequent danger of injury, though it may be applied to any vehicle-headlight. It is desirable in order to secure the best results that the entire number of light-rays be utilized and concentrated throughout the path to be illuminated, which in the ordinary bicycle-headlight lens is not the case. The objection to the ordinary lens in use is that it illuminates a wide angle close to the wheel, while the road in front is left in darkness, thereby greatly diminishing the probability of revealing an obstruction in the road to be traveled. By my improved lens the road from immediately in front of the wheel to a considerable distance ahead is thoroughly illuminated by a beam of light extending in a laterally-confined path, and any obstruction either close to or remote from the wheel is quickly revealed. These desirable results are secured by constructing the lens of vertical and horizontal prisms, the angles of refraction of the latter being made to vary from the top to the bottom of the lens—that is, each horizontal prism has a uniform refracting-surface of different angle from that of other horizontal prisms, whereas the vertical prisms have each a refracting-surface which in itself varies at different portions of the prism from top to bottom of the lens, all as will hereinafter more clearly appear.

In the drawings, Figure 1 is a vertical section of the lens through the center thereof on line $x$ $x$, Fig. 2. Fig. 2 is a front face view. Figs. 3 and 4 are horizontal sections of the lens on lines A B and C D, respectively, of Fig. 2.

The lens is preferably rectangular, as shown in Fig. 2, though it may be six or eight sided or of any desired form, and is usually cast or molded in one piece for convenience of manufacture.

In constructing this improved lens advantage is taken of the well-known property of the prism to deflect a ray of light as it passes therethrough first toward the normal of the incident surface and then as it passes from the dense medium of the prism into the less dense air away from the normal of the emergent surface. The direction of any ray of light may thus be controlled by changing the angle of the prism through which it is caused to pass.

In the drawings the lens E, shown preferably as rectangular in shape, has any usual form of center S, either plane or convex, and is provided with horizontal prisms $a$, $a'$, $a^2$, $a^3$, $a^4$, and $a^5$ and with vertical prisms $b$ $b'$ $b^2$. The number of horizontal and vertical prisms may of course be varied either more or less than those shown.

By the terms "angle" and "inclination" as used in the specification I mean the angle between the incident and emergent surfaces or the inclination of such surfaces to each other.

The horizontal prisms $a$, $a'$, $a^2$, $a^3$, $a^4$, and $a^5$ are constructed to have the emergent surface $f f'$ of each at a different angle from that of the other horizontal prisms, and this variation of angles is graduated successively from the top to the bottom of the lens in regular order—that is, the lower prism $a$ has its surface $f f'$ of very slight inclination, so that a ray of light from the source L striking the incident surface $e$ $e'$ of the lens at $l$ will be refracted as it emerges at $l'$ from the dense medium of the prism and intercept the ground in the direction of $l^2$ a few feet only ahead of the wheel. The prism $a'$ is made with a slightly greater angle of its emergent surface, so that a ray of light from L reaching the incident surface at $l^3$ will be refracted in the direction of $l^3$ to reach the ground a few feet ahead of the ray from prism $a$. Likewise the prism $a^2$ is constructed with a slightly greater angle than the prism $a'$, and for like reason its refracted ray $l^4$ will reach the ground a few feet ahead of that from prism $a'$, and so on regularly to the top of the lens. Each successive prism has its angle slightly increased in order to throw its emergent ray farther ahead, as prism $a^3$ in direction of $l^5$, prism $a^4$ in direction of $l^6$, and prism $a^5$ in direction of $l^7$. The effect of this regular variation in the angles of the horizontal prisms is that the rays of light emerging therefrom will form a continuous path of light upon the ground from a point close to the wheel to many feet ahead without at the same time crossing the rider's vision.

The vertical prisms $b\ b'\ b^2$ are arranged on opposite sides of the center S and are designed to refract the rays so as to produce a parallel beam of light where the rays intersect the ground, to thereby form a lighted path of uniform width from the wheel to the distant point reached by the upper horizontal prism. To this end the refracting-surface $d\ d'$ of each vertical prism varies in angle at different parts thereof, and this for the reason that the rays refracted by such prisms reach the ground at varying distances from the lens. The ray of light emerging from the lower portion of the vertical prism is to reach the ground at a point in close proximity thereto, for which reason the angle of the prism at its lower part is slight, whereas the ray from the upper part of the same vertical prism is to reach the ground many feet away, and therefore the angle of the prism at that part is greater. This feature is well shown in Figs. 3 and 4. Fig. 3 represents a section of the vertical prisms near the tops thereof on line A B, Fig. 2, and, as will be noticed, the angle of the emergent surface $d\ d'$ of each of said vertical prisms is much greater than the angle of the same surface nearer the ground, as shown in Fig. 4, which is a section on line C D of Fig. 2. In other words, the emergent surface of each of the vertical prisms constantly varies in angle from the bottom to the top to correspond to the distance the ray of light has to travel before reaching the ground. If the angles of the emergent surface of each of the vertical prisms were made uniform, the rays of light emanating from the lower portion of the vertical prisms would perhaps be of the desired width near the wheel; but the upper portion of the prisms would contract the rays into a much narrower path as their contact with the ground became more remote, whereas by varying the angle of the surface of each vertical prism uniformly from top to bottom the lighted path is made of a uniform width throughout.

Where the vertical and horizontal prisms meet, they are joined by a curved or what may for convenience be termed a "segmental" prism, as at $c$, Fig. 2, and as the angles of the horizontal and vertical prisms vary at their point of meeting the segmental joining-prism is constructed with a varying angle suited to harmonize at its points of meeting with the angles of the horizontal and vertical prisms. Thus no abrupt change takes place in joining the two sets of prisms and the pencils or rays of light are not interrupted and no dark areas are formed.

The lens when in place is preferably inclined slightly to the vertical, as indicated in Fig. 1, in order to secure the greatest illuminating effect upon the ground and prevent the rays from interfering in any manner with the rider's vision.

By angles of the prisms is meant the angle of the emergent surface to the incident surface thereof, such last-named surface $e\ e'$ being the same for all the prisms.

Having thus described the invention, what I claim as new, and desire to secure by Letters Patent, is—

1. A lens for vehicle-headlights having a series of vertical prisms, and a series of horizontal prisms varying in angle from the bottom to the top thereof the incident surface of such prisms being in substantially the same plane, substantially as described.

2. A lens for vehicle-headlights having a series of vertical prisms each of which varies in angle from the bottom to the top thereof, and a series of horizontal prisms varying in angle as between themselves from the bottom to the top of the lens, substantially as described.

3. A lens for vehicle-headlights having a series of vertical and horizontal prisms, segmental prisms joining said vertical and horizontal prisms and having varying angles, substantially as described.

4. A lens for vehicle-headlights having horizontal and vertical prisms, segmental prisms joining the same, the varying angles of these prisms being so arranged that a beam of light of uniform width and extended for a considerable distance ahead is projected on the ground.

In testimony whereof I affix my signature in presence of two witnesses.

JULIAN H. PITKIN.

Witnesses: